United States Patent [19]

Login et al.

[11] Patent Number: 5,236,993
[45] Date of Patent: Aug. 17, 1993

[54] PROCESS OF CROSSLINKING PVP

[75] Inventors: Robert B. Login, Oakland; Jenn S. Shih, Paramus; Jui-Chang Chuang, Wayne, all of N.J.

[73] Assignee: ISP Investments Inc., Wilmington, Del.

[21] Appl. No.: 945,453

[22] Filed: Sep. 16, 1992

[51] Int. Cl.$^5$ .................. C08L 39/00; C08F 26/10
[52] U.S. Cl. .................. 524/548; 525/326.9; 526/263; 526/264
[58] Field of Search .............. 524/548; 526/264, 263; 525/326.9

[56] References Cited

U.S. PATENT DOCUMENTS

| | | | |
|---|---|---|---|
| 4,223,009 | 8/1980 | Chakrabarti | 424/47 |
| 4,604,217 | 8/1986 | Lukach et al. | 252/8.55 |
| 4,692,328 | 9/1987 | Kitchell et al. | 424/78 |
| 4,772,484 | 9/1988 | Kitchell et al. | 427/2 |
| 4,853,437 | 8/1989 | Lukach et al. | 525/54.21 |
| 5,045,617 | 9/1991 | Shih et al. | 526/264 |
| 5,191,043 | 3/1993 | Shih | 526/264 |

Primary Examiner—John Kight, III
Assistant Examiner—Richard Jones
Attorney, Agent, or Firm—Walter Katz; Marilyn J. Maue; Joshua J. Ward

[57] ABSTRACT

A method of crosslinking polyvinylpyrrolidone (PVP) at a predetermined pH which comprises (a) providing a tertiary amino-functional PVP as a starting material, (b) condensing said starting material with a predetermined amount of epichlorohydrin to form an epichlorohydrin-functional PVP copolymer, and, if less than an equivalent of epichlorohydrin in use, unreacted starting material, (c) acidifying the resultant copolymer to form a solution of a storage stable glycidyl quat intermediate, and (d) increasing the pH of the solution to above 7 to convert the glycidyl quat into a glycidyl epoxide, and (e) crosslinking the glycidyl epoxide with free amine group on the copolymer or as added amine functional PVP copolymer to form a crosslinked PVP polymer.

4 Claims, No Drawings

PROCESS OF CROSSLINKING PVP

BACKGROUND OF THE INVENTION

Cross-Reference to Related U.S. patent applications

U.S. patent applications Ser. Nos. 879 411, filed May 6, 1992, now U.S. Pat. No. 5,194,546, and 888,998, filed May 26, 1992, now U.S. Pat. No. 5,206,322, by the same inventors as herein, and assigned to the same assignee, described and claimed the starting material used in this invention.

1. Field of the Invention

This invention relates to crosslinked PVP, and, more particularly, to a method of crosslinking a stable, crosslinkable PVP solution by changing the pH of the solution.

2 Description of the Prior Art

Merijan, in U.S. Pat. No. 3,563,968, described the preparation of functional graft homopolymers of vinyl lactams, e.g. vinyl pyrrolidone, by reaction of polyvinylpyrrolidone with allyl amine or allyl alcohol in ethanol solvent in a bomb reactor at 130°–140°C.

Kitchell, in U.S. Pat. Nos. 4,692,328 and 4,772,484, disclosed the chemical crosslinking reaction of functional graft homopolymers of vinyl pyrrolidone with glutaraldehyde to form a gel which was useful in biological applications. Polyvinylpyrrolidone (PVP) and PVP copolymers also have been crosslinked physically using E-beam or gamma radiation.

However, it would be of advantage to provide a simple method of crosslinking a stable, crosslinkable vinyl lactam polymer, at a predetermined pH, without requiring further condensation with a glutaraldehyde, or the use of expensive radiation equipment.

SUMMARY OF THE INVENTION

A method of crosslinking polyvinylpyrrolidone (PVP) at a predetermined pH which comprises (a) providing a tertiary amino-functional PVP as a starting material, (b) condensing said starting material with a predetermined amount of epichlorohydrin to form an epichlorohydrin-functional PVP copolymer, and, if less than an equivalent of epichlorohydrin in use, unreacted starting material, (c) acidifying the resultant copolymer to form a solution of a storage stable glycidyl quat intermediate, and (d) increasing the pH of the solution to above 7 to convert the glycidyl quat into a glycidyl epoxide, and (e) crosslinking the glycidyl epoxide with free amine group on the copolymer or as added amine functional PVP copolymer to form a crosslinked PVP polymer.

BRIEF DESCRIPTION OF THE INVENTION

The Table below is a schematic representation of the chemical steps involved in the process of the present invention.

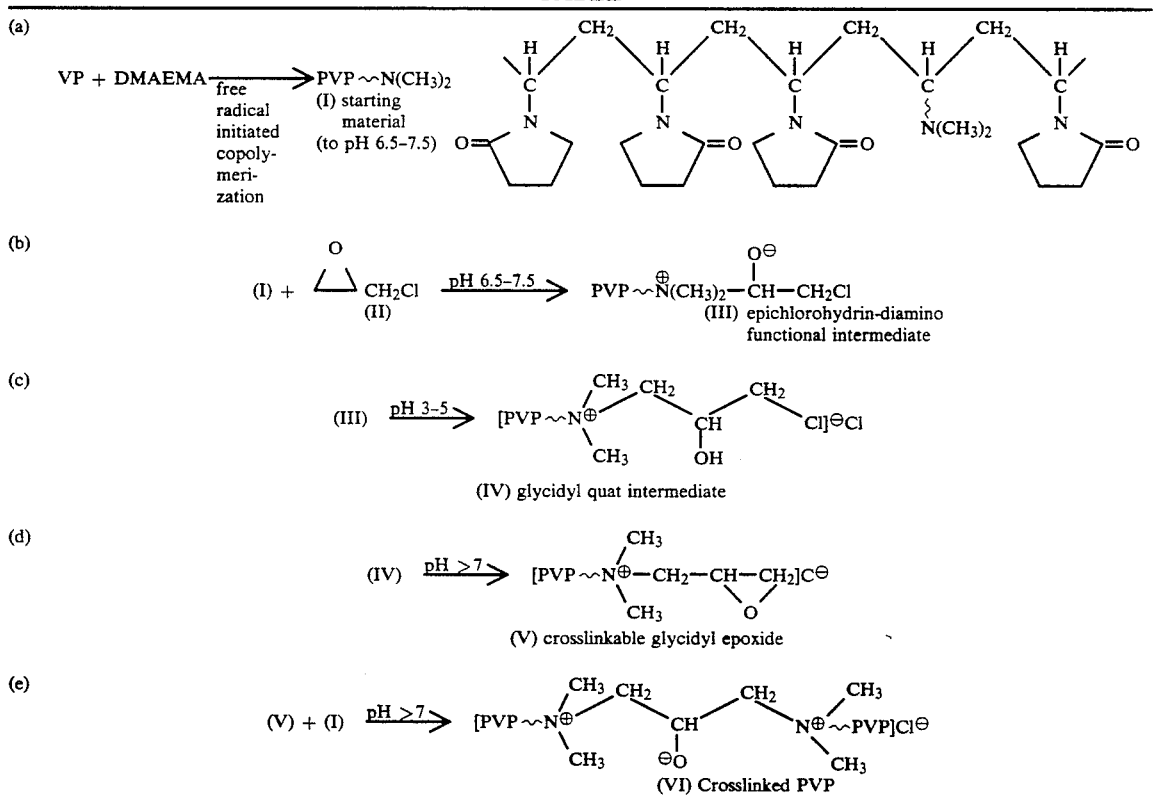

TABLE

The starting material of step (a) is prepared by copolymerizing vinyl pyrrolidone and N,N-dimethylamino acrylate or methacrylate (DMAEMA) or N,N-dimethaminopropyl acrylamide or methacrylamide, according to the process described in U.S. Pat. No. 4,223,009. The product is a PVP-copolymer (I) having a tertiary amino, i.e. a dimethylamino functionality, which is adjusted to pH of 6.5–7.5. Suitably the copolymer contains about 1–50 mole % of the amino functionality preferably 5–20 mole %.

In step (b), at a pH of about 6.5–7.5, starting material (I) is condensed with one or less than one equivalent, preferably a 1:1 equivalent ratio, based upon amine titer of epichlorohydrin (ECH) (II) to form an epichlorohydrin-diamino functional PVP intermediate (III).

In step (c), the pH of the solution is reduced to about 3-5 to form a stable glycidyl quat intermediate (IV), In step (d), the solution is made basic (pH >7), whereupon the glycidyl quat is converted to its crosslinkable glycidyl epoxide (V); whereupon, In step (e), at the same pH, (V) and (I), either as unreacted starting material, when epichlorohydrin is less than one equivalent, or, in the preferred embodiment, as added (I), when epichlorohydrin is reacted in equivalent amounts with (I), are crosslinked to form a crosslinked PVP product (VI).

The invention will now be described by reference to the following examples.

EXAMPLE 1

Step (a)

Preparation of Functional VP-DMAEMA Copolymer Starting Material

A 5-liter, 4-necked round bottom glass flask is equipped with a heating mantle, mechanical agitator, condenser, thermowell, thermometer and a 3-liter graduated pressure equalizing dropping funnel, is charged with a heel charge of 200 grams of VP and 25 grams of DMAEMA added to 225 grams deionized water. The mixture is chilled in ice water and concentrated HCl is added dropwise to the stirred chilled mixture to adjust the pH to 6.5 to 7.5. The ice bath is removed and replaced by a heating mantle. To the dropping funnel is added an aqueous mixture of 745 grams of VP, 216 grams of DMAEMA, 0.4 grams tAPP* in 2137 grams of deionized water. This mixture is pH adjusted in an ice bath in the same manner as the heel charge before addition to the dropping funnel. Both the heel and dropping funnel charges are sparged for ½ hour with $N_2$. When the heel reaches 65°C., 0.1 grams of tAPP is added and the dropping funnel charge is started and added over four hours at 65° C. reaction temperature. After the four hours addition, heating is continued at 65° C. for another hour followed by hourly additions of 0.1 grams of tAPP until residual VP is less than 0.05%. At this point, a 34-36% mixture of the neutral polymeric salt of a copolymer of 85/15 mole % VP/DMAEMA is present. The pH of the mixture then is adjusted to 6.5-7.5.

*tertiary amylperoxy pivalate

Step (b)

Condensation of Starting Material (I) and ECH

The copolymer solution of step (a) is condensed with a ½ equivalent of epichlorohydrin based on the total amine titer of the copolymer, by adding ECH dropwide to the mixture at 65°-75° C. over a one hour period. The mixture then is stirred and heated for about two hours or until the inorganic chloride content in the product is in range of about 0.21 meq/g.

Step (c)

Formation of Glycidyl Ouat Intermediate

The pH of the mixture then is adjusted to 3-5 with concentrated HCl. The product is a stable glycidyl quat intermediate (IV) and ½ unreacted (I) in acid form.

Step (d)

Conversion of Glycidyl Quat to Glycidyl Epoxide (V)

The pH of the mixture then is adjusted upwards with base to a pH >7. At this pH, the glycidyl quat intermediate is converted in its corresponding crosslinkable glycidyl epoxide and, if less than one equivalent of ECH was used, free amine is present in the polymer.

Step (e)

Formation of - Crosslinked PVP (VI)

The crosslinkable glycidyl epoxide and an equivalent amount of amine functionality as added copolymer (I) are crosslinked to form a crosslinked PVP polymer product (VI). Alternatively, some free amines present on the polymer chain may be reacted in situ to form the crosslinked product.

EXAMPLE 2

The procedure of Example 1 is repeated using N,N-diaminopropyl acrylamide and methacrylamide, in place of DMAEMA, with similar results.

APPLICATIONS OF CROSSLINKED PVP GEL PRODUCT OF INVENTION

The crosslinked pvp polymer of the invention, in solution or gel form, is used in such commercial applications as a controlled release media for pharmaceuticals, for bandages and wound dressings, for growth of cells, as an artificial skin or skin coating, and as an electrolead on a conductive foil backing.

While the invention has been described with particular reference to certain embodiments thereof, it will be understood that changes and modifications may be made which are within the skill of the art. Accordingly, it is intended to be bound only by the following claims, in which:

What is claimed is:

1. A method of crosslinking PVP which comprises:
   (a) providing a starting material which is a functional PVP copolymer of vinyl pyrrolidone and N,N-dialkylamino alkyl acrylate or methacrylate, N,N-dimethylaminopropyl acrylamide or methacrylamide monomers at a pH of about 6.5-7.5, in aqueous or aqueous-alcoholic solution,
   (b) condensing an equivalent or less than an equivalent of epichlorohydrin based on the total amine titer in the starting material to form a solution of epichlorohydrin-functional copolymer, and, if less than an equivalent of epichlorohydrin is used, unreacted free amine on the copolymer,
   (c) acidifying the solution to a pH of about 3-5 to form a stable glycidyl quat,
   (d) increasing the pH of the acidified solution to above 7 to convert the glycidyl quat into a crosslinkable glycidyl epoxide, and
   (e) crosslinking the glycidyl epoxide with unreacted free amine on the copolymer, or as added amine-functional PVP copolymer, to form a crosslinked PVP polymer.

2. A method according to claim 1 wherein, in step (a), less than an equivalent of the epichlorohydrin is used.

3. A method according to claim 1 wherein in step (a), substantially an equivalent amount of the epichlorohydrin is used.

4. A storage stable, crosslinkable glycidyl quat in acidic solution which is the reaction product of a tertiary amino-functional PVP copolymer and an equivalent or less than an equivalent of an epichlorohydrin.

* * * * *